Oct. 22, 1929.  K. TESSKY  1,732,388
DRIVING MECHANISM FOR MACHINE TOOLS
Filed Aug. 14, 1926
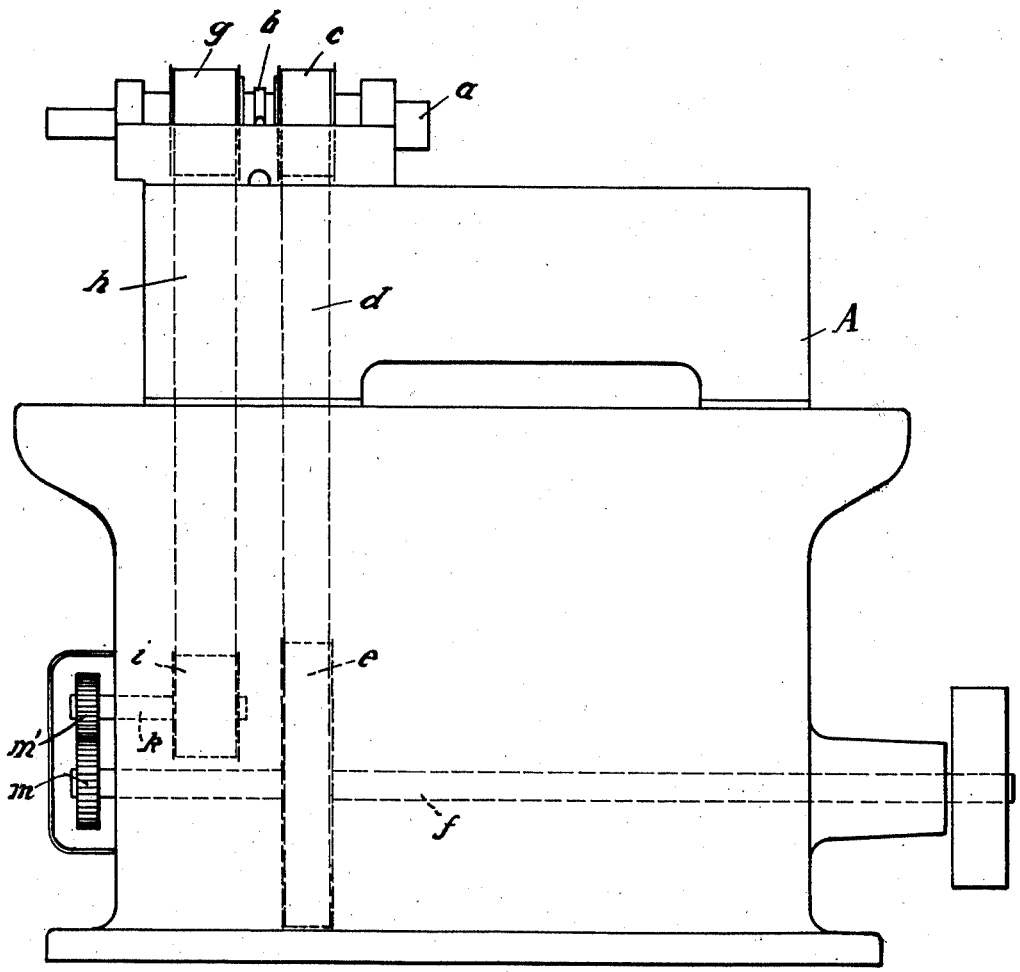

Patented Oct. 22, 1929

1,732,388

UNITED STATES PATENT OFFICE

KARL TESSKY, OF ESSLINGEN-ON-THE-NECKAR, GERMANY

DRIVING MECHANISM FOR MACHINE TOOLS

Application filed August 14, 1926, Serial No. 129,216, and in Germany September 12, 1925.

My invention relates to driving mechanism for machine tools and more particularly lathes and other machine tools comprising screwing equipment, such mechanism having two pulleys rotating in opposite directions. It is an object of my invention to avoid the usual crossed belt and the difficulties involved by its use. To this end, instead of a crossed and an open belt I provide two open belts, and in order to obtain the opposite rotation of one of the pulleys which is required for its purpose, I connect one of said belts with the driving shaft by means of a pair of spur gears so that the rotation of the driving shaft is reversed with respect to the belt.

In screwing machines it is necessary that the tool spindle should rotate slowly when cutting whereas it should rotate at a considerably higher speed on the return stroke and when the machine is used for turning. As a rule the tool spindle is provided with a sleeve adapted to be displaced thereon, but held against rotation by a spline, and with two driving pulleys on opposite sides of said sleeve, one of which rotates slowly in one direction, while the other rotates rapidly in the opposite direction.

In the old system, rotation is imparted to the pulleys through the medium of an open and a crossed belt from a driving shaft carried in the frame of the machine. Tension pulleys must be provided for both belts, but the arrangement of such pulleys involves difficulties with respect to the crossed belt, as the short length of belt available due to the crossing of the belt is still further reduced by the tension pulleys. This involved such difficulties that in the end the crossed belt was eliminated altogether and was replaced by bevel gearing between the two pulleys on the driving shaft. This contrivance, however, was not satisfactory because of the small clearance between the pulleys the dimensions of the gears and their bearings had to be so small that continuous operation was impracticable. Gears of other types are not suitable in the present instance because they require much more space, particularly at the tool spindle, than is available for the spindle drive of such machines.

In view of these unsatisfactory conditions the old belt drive was readopted notwithstanding its drawbacks.

The mechanism according to my invention with its pair of spur gears eliminates another drawback of the usual belt drive, viz, the necessity of exchanging the pulleys on the driving shaft and varying the length of the belts if it is desired to vary the ratio for various metals. For instance, if brass is machined, the ratio is 1:2, for iron as a rule 1:4. In the new mechanism the variation is effected simply by exchanging the spur gears.

In the drawings affixed to this specification and forming part thereof a driving mechanism embodying my invention is illustrated diagrammatically by way of example.

Referring to the single figure of the drawing, $a$ is the tool spindle which is supported in bearings on the frame A of the machine, $b$ is a clutch sleeve adapted to be displaced on, but to rotate with the spindle, and $c$ and $g$ are pulleys arranged on opposite sides of the sleeve $b$ to rotate freely on the spindle $a$. $f$ is the driving shaft, $e$ is a pulley on the shaft and $d$ is a belt which imparts rapid rotation to the pulley $c$. $m$ is a spur gear keyed on the driving shaft, $m'$ is a gear which meshes with the gear $m$, $k$ is an intermediate shaft, $i$ is a pulley on this shaft and $h$ is a belt imparting rotation to a pulley $g$, which is free to rotate on the spindle $a$ on the other side of the sleeve $b$, to which slower rotation is imparted by the gear described. Both belts $d$ and $h$ are open, the opposite rotation of the pulley $g$ being brought about by the gears $m$, $m'$.

The gear $m'$ is smaller than the gear $m$ so that with the gear $m'$ keyed onto the intermediate shaft $k$, as illustrated, the intermediate shaft will be rotated at increased speed. By exchanging the gears the speed of the shaft is reduced. In this manner the speed ratio of the pulleys $c$ and $g$ is varied without exchanging the pulleys on the driving shaft $f$ and adapting the length of the belts, as in the old system. The pulley $i$ can be of substantially the same diameter as the pulley $g$ so that its shaft $k$ may be arranged in close vicinity to the driving shaft $f$.

I wish it to be understood that I do not desire to be limited to the exact details of construction shown and described, for obvious modifications will occur to a person skilled in the art.

I claim:—

An automatic lathe comprising a frame, a driving shaft rotatably supported in said frame, a driven shaft, a pair of loose pulleys on said driven shaft, a clutch between said pulleys and connected to the driven shaft, said clutch being constructed to engage either of said pulleys to be driven by them, a pulley on said driving shaft, an open belt connecting said pulley on said driving shaft with one of said loose pulleys on said driven shaft, a lay shaft arranged in said frame parallel to said driving shaft, a pair of exchangeable spur gears arranged on said driving and said lay shafts in meshing relation, a pulley on said lay shaft arranged intermediate said gears and said pulley on said driving shaft, and an open belt connecting said pulley on said lay shaft with the other one of said loose pulleys on said driven shaft.

In testimony whereof I affix my signature.

KARL TESSKY.